US010135328B2

United States Patent
Sato et al.

(10) Patent No.: US 10,135,328 B2
(45) Date of Patent: Nov. 20, 2018

(54) DISTRIBUTED DRIVING SYSTEM

(71) Applicant: Renesas Electronics America Inc., Santa Clara, CA (US)

(72) Inventors: Tetsuo Sato, San Jose, CA (US); Ryotaro Kudo, Takasaki (JP); Hideo Ishii, Takasaki (JP); Kenichi Nakano, Takasaki (JP)

(73) Assignee: RENESAS ELECTRONICS AMERICA INC., Santa Clara, CA (US)

( * ) Notice: Subject to any disclaimer, the term of this patent is extended or adjusted under 35 U.S.C. 154(b) by 0 days.

(21) Appl. No.: 15/804,241

(22) Filed: Nov. 6, 2017

(65) Prior Publication Data

US 2018/0062501 A1    Mar. 1, 2018

Related U.S. Application Data

(63) Continuation of application No. 13/347,197, filed on Jan. 10, 2012, now Pat. No. 9,812,942.

(51) Int. Cl.
*G05F 3/16* (2006.01)
*H02M 1/088* (2006.01)
*H02M 3/158* (2006.01)
*H02M 1/00* (2006.01)

(52) U.S. Cl.
CPC ........... *H02M 1/088* (2013.01); *H02M 3/158* (2013.01); *H02M 2001/0054* (2013.01); *Y02B 70/1491* (2013.01)

(58) Field of Classification Search
CPC ......... H02M 1/088; H02M 2001/0054; H02M 3/158
See application file for complete search history.

(56) References Cited

U.S. PATENT DOCUMENTS

| | | |
|---|---|---|
| 5,006,733 A | 4/1991 | Brown |
| 5,966,024 A | 10/1999 | Bui et al. |
| 6,160,441 A | 12/2000 | Stratakos et al. |
| 6,362,798 B1 | 3/2002 | Kimura et al. |
| 6,445,244 B1 | 9/2002 | Stratakos et al. |
| 7,330,375 B2 | 2/2008 | Daga et al. |
| 7,349,193 B2 | 3/2008 | Cheever, Jr. |
| 7,368,898 B2 | 5/2008 | Sutardja et al. |
| 7,408,333 B2 | 8/2008 | Chen et al. |
| 7,408,388 B2 | 8/2008 | Nagasawa et al. |
| 7,605,598 B2 | 10/2009 | Kelly |
| 8,072,199 B2 | 12/2011 | Nagase |
| 8,471,545 B2 | 6/2013 | Couleur et al. |
| 2005/0151571 A1 | 7/2005 | Brown et al. |
| 2006/0055388 A1 | 3/2006 | Tang et al. |
| 2009/0015224 A1 | 1/2009 | Hirao et al. |

(Continued)

*Primary Examiner* — Adolf Berhane
*Assistant Examiner* — Afework Demisse
(74) *Attorney, Agent, or Firm* — Foley & Lardner LLP

(57) ABSTRACT

A step down convertor with a distributed driving system. In one embodiment, an apparatus is disclosed that includes an inductor coupled to an output node. The apparatus also includes first and second circuits. The first circuit can transmit current to the output node via the inductor, and the second can transmit current to the output node via the inductor. The apparatus also includes a third circuit for modifying operational aspects of the first circuit or the second circuit based on a magnitude of current flowing through the inductor.

12 Claims, 5 Drawing Sheets

(56) References Cited

U.S. PATENT DOCUMENTS

| | | |
|---|---|---|
| 2010/0295521 A1* | 11/2010 | Odaohhara .............. G06F 1/26 323/282 |
| 2011/0018508 A1 | 1/2011 | Ueunten |
| 2011/0095741 A1 | 4/2011 | Huang et al. |
| 2011/0115471 A1 | 5/2011 | Sato et al. |
| 2011/0157919 A1 | 6/2011 | Yedevelly et al. |
| 2011/0260537 A1 | 10/2011 | Tang et al. |
| 2011/0291632 A1 | 12/2011 | Yu et al. |

* cited by examiner

US 10,135,328 B2

DISTRIBUTED DRIVING SYSTEM

CROSS-REFERENCE TO RELATED APPLICATIONS

The present patent application is a continuation of U.S. patent application Ser. No. 13/347,197, filed on Jan. 10, 2012, entitled "Distributed Driving System" and is incorporated by reference herein in its entirety and for all purposes as if completely and fully set forth herein.

BACKGROUND OF THE INVENTION

A step down DC-to-DC converter is an electronic circuit that converts a source of direct current (DC) from one voltage level to another. Step down DC-DC converters are important components in many electronic devices such as cellular phones, computers, etc, that contain one or more sub-circuits, each requiring its own lower DC voltage level.

Step down DC-DC converters are often non-isolated, which means they do not employ a transformer in generating a lower output voltage. The present invention will be described with reference to non-isolated, step down DC-DC converters, it being understood the present invention should not be limited thereto.

SUMMARY OF THE INVENTION

A step down convertor with a distributed driving system. In one embodiment, an apparatus is disclosed that includes an inductor coupled to an output node. The apparatus also includes first and second circuits. The first circuit can transmit current to the output node via the inductor, and the second can transmit current to the output node via the inductor. The apparatus also includes a third circuit for modifying operational aspects of the first circuit or the second circuit based on a magnitude of current flowing through the inductor.

BRIEF DESCRIPTION OF THE DRAWINGS

The present invention may be better understood in its numerous objects, features, and advantages made apparent to those skilled in the art by referencing the accompanying drawings.

The use of the same reference symbols in different drawings indicates similar or identical items.

DETAILED DESCRIPTION

Non-isolated, step down DC-DC converters (hereinafter DC-DC converters) provide DC current at lower voltages for circuits such as central processing units (CPUs). The present invention will be described with reference to DC-DC converters providing current at a lower voltage to CPUs, it being understood the present invention should not be limited thereto.

The voltage required by modern CPUs is becoming lower and lower in order to increase their calculation speed. At the same time, the current these modern CPUs require is becoming higher and higher. To put into context, some modern CPUs may require a voltage less than 1 volt and current of more than 150 amps to operate according to specifications. DC-DC convertors are capable of satisfying the low voltage, high current requirements of modern CPUs.

DC-DC converters should be capable of quickly responding to a change in current needed by a CPU during operation thereof. During a time when little calculation is required, the CPU will draw little current. However, when a significant amount of calculation is required in a short amount of time, the CPU may draw a substantially larger current. A DC-DC converter transition between supplying small current and supplying large current should be very fast to avoid any adverse affect on the operation of the CPU. Lastly, and perhaps more importantly, DC-DC converters should be power efficient during operation.

Figure 1:
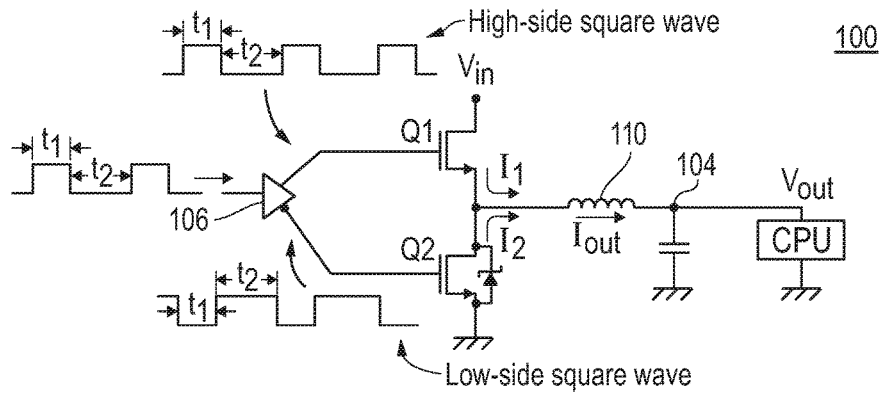
FIG. 1 is a block diagram illustrating an example DC-DC convertor.

FIG. 1 illustrates in block diagram form, an example DC-DC converter 100 that can supply a low voltage current to a CPU. The DC-DC converter 100 is coupled to a source (e.g., a battery) having source voltage Vin. DC-DC converter 100 provides an output voltage Vout and an output current Iout that varies in magnitude according to the demands of the CPU. High-side and low-side transistors Q1 and Q2, respectively, are coupled to inductor 110, which in turn is coupled to the CPU via an output node 104 as shown. For purposes of explanation, all transistors described herein will take form in n-channel or p-channel MOSFETs, it being understood the present invention should not be limited thereto. Moreover, the DC-DC converters described herein are formed as a single integrated circuit on one silicon substrate, except where noted, it being understood the present invention should not be limited thereto.

A driver circuit 106 generates complementary, high-side and low-side square waves that are received by the gates of transistors Q1 and Q2, respectively. Driver 106 generates these square waves as a function of a square wave input Vsw having a duty cycle of t1/(t1+t2) as shown. One of ordinary skill in the art understands that the magnitude of Vout depends on the duty cycle t1/(t1+t2). The frequency of all square waves described herein can vary between 300 kilohertz to 2 megahertz, it being understood that the present invention should not be limited thereto.

Figure 2:
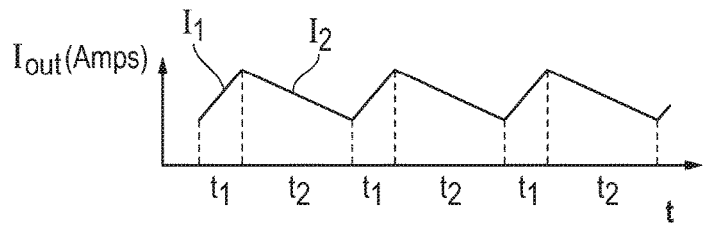
FIG. 2 is a graphical representation of output current of the DC-DC convertor shown in FIG. 1.

The pulses of the square waves activate Q1 and Q2. The high-side square wave provided to Q1 has a pulse width of t1, while the low-side square wave provided to Q2 has a pulse width of t2. Q1 transmits current I1 to output node 104 via inductor 110 with each pulse of the high-side square wave, and Q2 transmits current I2 from ground to output node 104 via inductor 110 with each pulse of the low-side square wave. FIG. 2 illustrates a graphical representation of currents I1 and I2, the combination of which forms Iout. Since the high-side and low-side square waves are complementary, which means they do not have overlapping pulses, only one of Q1 and Q2 transmits current at any given time.

As noted above, DC-DC converters should be power efficient and quick to respond to a change in Iout. Power efficiency is particularly important for DC-DC converters employed in portable systems (e.g., laptop computers, tablet computers or cell phones) that use batteries. The power efficiency of DC-DC converters can be calculated as a function of power-in versus power-out. In general, the power efficiency for DC-DC converter 100 can be expressed as 100×(Vout×Iout)/(Vin×Iin), where Iin is the input current of DC-DC converter 100, which includes the current used by driver circuit 106.

DC-DC convertors consume power in several different ways. Power is consumed by the conduction of current between sources and drains of active transistors such as Q1 or Q2. The amount of this power loss depends on the magnitudes of RdsOn, the resistance that exists between the drain and source, and the current. One of ordinary skill understands that this power loss (hereinafter referred to as conduction loss) varies exponentially with the magnitude of current flow. Larger transistors may have smaller RdsOn values and may lose less power when compared to the loss of power in smaller transistors given the same magnitude of current flow between source and drain. Another loss affecting power efficiency is attributable to switching transistors (e.g., Q1 and Q2) between the active and inactive states. These switching losses vary with the size of the gate of transistors; the bigger the gate, the more charge is needed to activate the transistor in the same amount of time. Switching loss can be reduced by reducing the size of the size of transistors including the gates thereof. Driver 106 also consumes power during operation, and this source of power loss will be referred to as driver loss.

Figure 3:
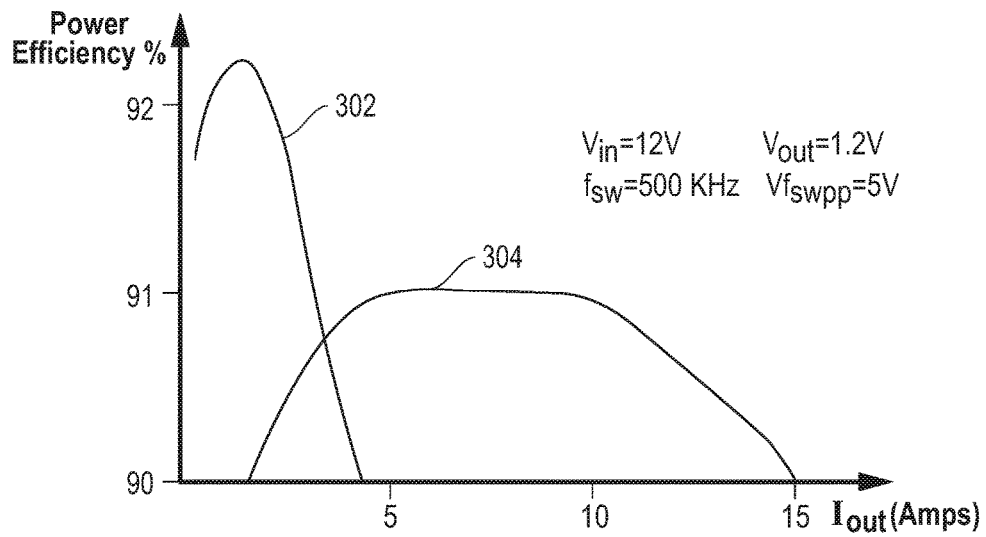
FIG. 3 are graphical representations of the power efficiency for two different embodiments of the DC-DC convertor shown in FIG. 1.

With continuing reference to FIGS. 1 and 2, if output current Iout is small, conduction loss or the power loss attributed to current flow through transistors Q1 or Q2 should be small when compared to the power loss attributed to switching transistors Q1 and Q2 between the active and inactive states. However, if Iout is large, the power loss attributed to current flow through transistors Q1 or Q2 may be substantially large when compared to the loss attributed to switching transistors Q1 and Q2. To illustrate, FIG. 3 shows graphs that represent the power efficiency of DC-DC converter 100 with different configurations for transistor Q2. More particularly, graph 302 represents the power efficiency of circuit 100 as a function of Iout when transistor Q2 is small or has a small gate area. In contrast, graph 304 represents the power transfer efficiency of DC-DC circuit 100 as a function of Iout when transistor Q2 is large or has a larger gate area. All variables (e.g., duty cycle, frequency of square wave inputs to Q1 and Q2, etc.) of DC-DC converter 100, except for Iout, are presumed constant in graphs 302 and 304.

DC-DC circuit 100 is very efficient with a small Q2 for low values of output current Iout as can be seen in graph 302. However, the power efficiency drops when Iout increases due to higher conduction loses. In contrast, the power efficiency of DC-DC circuit 100 with a large Q2 is relatively low for low values of Iout due to higher switching loss, but increases with Iout as seen in graph 304. A DC-DC converter is needed that is power efficient when the magnitude output current Iout is low or high. And this is particularly true for DC-DC converters that are employed to provide voltage and current to a load such as a CPU, which may need to draw a small current at one point in time and a large current shortly later.

Figure 4:
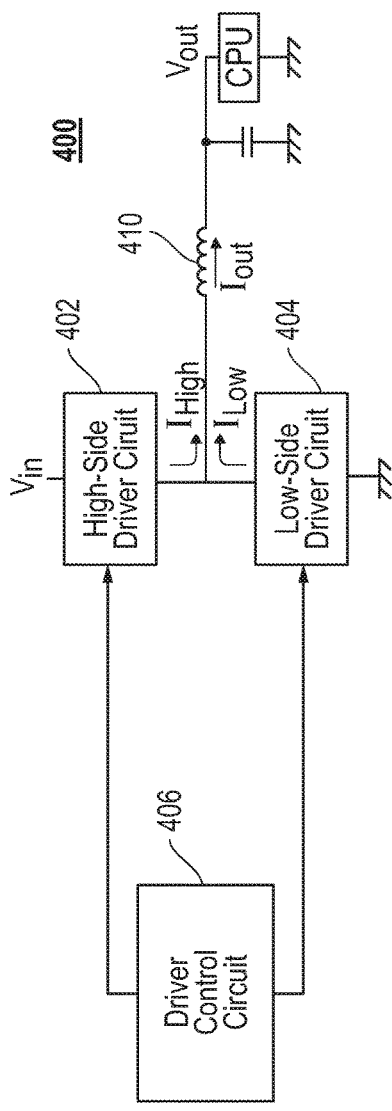
FIG. 4 is a block diagram illustrating relevant components of another DC-DC convertor.

FIG. 4 illustrates another example DC-DC converter 400 that is coupled to and provides a DC current Iout at a lower voltage Vout to a CPU. In contrast to the DC-DC converter 100 of FIG. 1, DC-DC converter 400 is capable of dynamic self adjustment to reduce power loss. In one embodiment, DC-DC converter 400 adjusts its configuration based on the magnitude of Iout. If Iout increases, DC-DC converter 400 may reconfigure itself to reduce conduction loss, and if Iout decreases, DC-DC converter 400 may reconfigure itself to reduce switching loss. These and additional aspects of DC-DC converter 400 will be more fully described below.

DC-DC converter 400 includes a high-side driver circuit 402 coupled to a low-side driver circuit 404 as shown. A driver control circuit 406 controls both high-side driver circuit 402 and low-side driver circuit 404 in a variety of ways. For example, driver control circuit 406 activates or deactivates driver circuits 402 and 404. When activated, high-side driver circuit 402 transmits current Ihigh to the CPU via inductor 410, and when activated, low-side driver circuit 404 transmits current Ilow to the CPU via inductor 410. In one embodiment, high-side driver circuit 402 is activated when low-side driver circuit 404 is deactivated, and vice-versa. Neither driver circuit supplies current when deactivated.

Driver control circuit 406 can directly or indirectly measure the magnitude of current supplied to the CPU. Based on this measurement, driver control circuit 406 can adjust low-side driver circuit 404 to reduce power consumption. In another embodiment, driver control circuit 406 can adjust low-side driver circuit 404 and high-side driver circuit 402 based on the measured current to reduce power consumption. Additionally, driver control circuit 406 is fast. For example, every microsecond driver control circuit 406 can measure current, and adjust driver circuit 402 and/or driver circuit 406 in accordance therewith.

Figure 5:
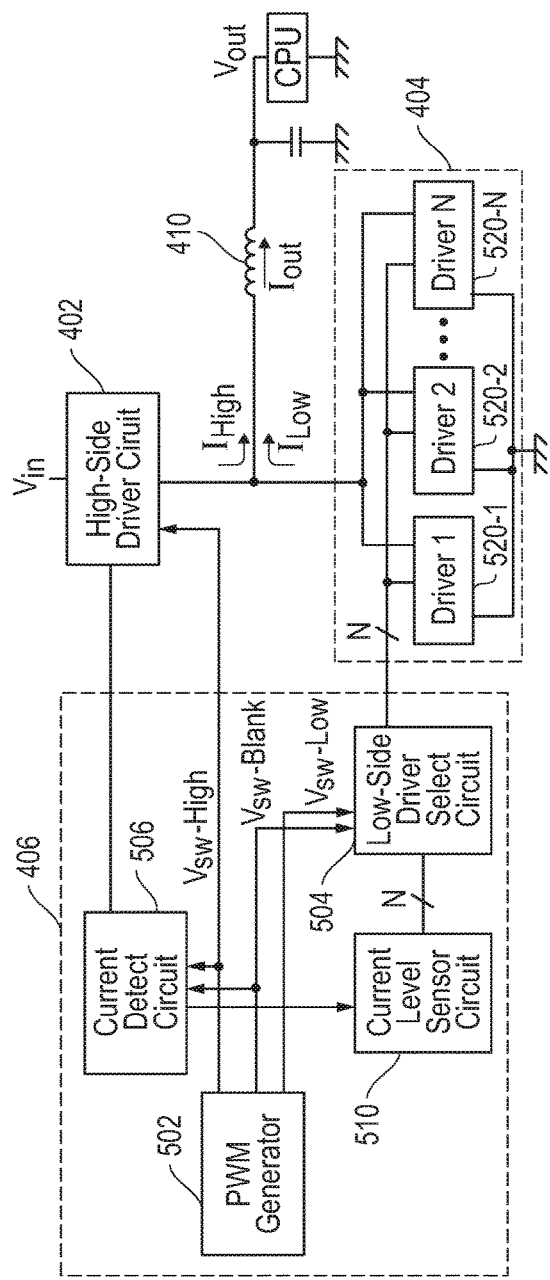
FIG. 5 is a block diagram illustrating relevant components of one embodiment of the DC-DC convertor shown in FIG. 4.

FIG. 5 is a block diagram illustrating relevant components of one embodiment of the DC-DC circuit 400 shown within FIG. 4. In this embodiment, driver control circuit 406 includes several components including a PWM generator 502 coupled to low-side driver select circuit 504, current detect circuit 506, and current level sensor circuit 510. Low-side driver circuit 404 includes N driver circuits 520-1-520-N in the embodiment shown. In one embodiment, each drive circuit 520 may be identical to each other in structure. In another embodiment, drive circuits 520 may differ in structure.

PWM generator 502 generates distinct square waves for various components. These square waves include (1) high-side square wave Vsw-High that is provided to high-side driver circuit 402, and current detect circuit 506, (2) low-side square wave Vsw-Low that is provided to low-side driver select circuit 504, and (3) a short-pulsed, square wave Vsw-Blank that is provided to current detection circuit 506 and low-side driver select circuit 504. High-side driver circuit 402 supplies Ihigh with each pulse of Vsw-High. Low-side driver circuit 404 supplies Ilow with each pulse of Vsw-Low. Vsw-Blank is used in one embodiment to remove unwanted transient current components that could otherwise adversely affect the operation of DC-DC converter 400 as will be more fully described below. These square waves are generated with the same frequency fsw which can vary, in one embodiment, between 300 kilohertz to 2 megahertz. Moreover, driver control circuit can quickly adjust low-side driver circuit 404 (e.g., at a rate equal to fsw). In one embodiment, driver control circuit 506 can adjust low-side driver circuit 404 based on a voltage Vref that is proportional in magnitude to Ihigh.

High-side current detect circuit 506 and high-side driver circuit 402 both receive square wave Vsw-High. Current detect circuit 506 is coupled to high-side driver circuit 402, and during each pulse of Vsw-High current detect circuit 506 generates a reference current Iref that is proportional to Ihigh. Iref is subsequently converted into a corresponding voltage Vref. Current level sensor circuit 510 generates an N-bit voltage reference level (VRL) signal based on Vref with each pulse of Vsw-High. The value of VRL depends on the magnitude of Vref and thus Iref and Ihigh. Current level sensor circuit 510 can also eliminate transient current components in Iref using Vsw-Blank as will be more fully described below.

Low-side driver select circuit 504 receives the N-bit VRL signal, and square waves Vsw-Blank and Vsw-Low. Low-side driver select circuit 504 generates an N-bit driver select (DS) signal based on the N-bit VRL signal with each pulse of Vsw-Low. The value of DS is held at the output of low-side driver select circuit 504 until low-side driver select circuit 504 is reset by Vsw-Blank as will be more fully described below.

The N drive circuits 520-1-520-N of low-side driver circuit 404 are controlled by respective bits of the N-bit DS signal. When a bit of the DS signal is high, the corresponding drive circuit 520 may be activated to transmit current to output node 408 via inductor 410, and when the bit is set low, the drive circuit 520 is deactivated and does not transmit current. Depending on the value of DS, several of the low-side drive circuits 520 may concurrently transmit current during a pulse of Vsw-Low, the aggregate of which forms Ilow. It is noted that when the one or more drive circuits 520 are activated and transmitting current towards output node 408, high-side driver circuit 402 is deactivated, and when high-side driver circuit 402 is activated and transmitting Ihigh towards output node 408, none of the low-side drive circuits 504 are transmitting current.

The number of drive circuits 520 concurrently activated and transmitting current affects the power consumption that is attributable to conduction and/or switching losses. Switching loss may increase with the number of drive circuits 520 that are concurrently activated to conduct current. However, conduction loss may decrease with the number of drive circuits 520 that are activated to conduct current.

Figure 6:
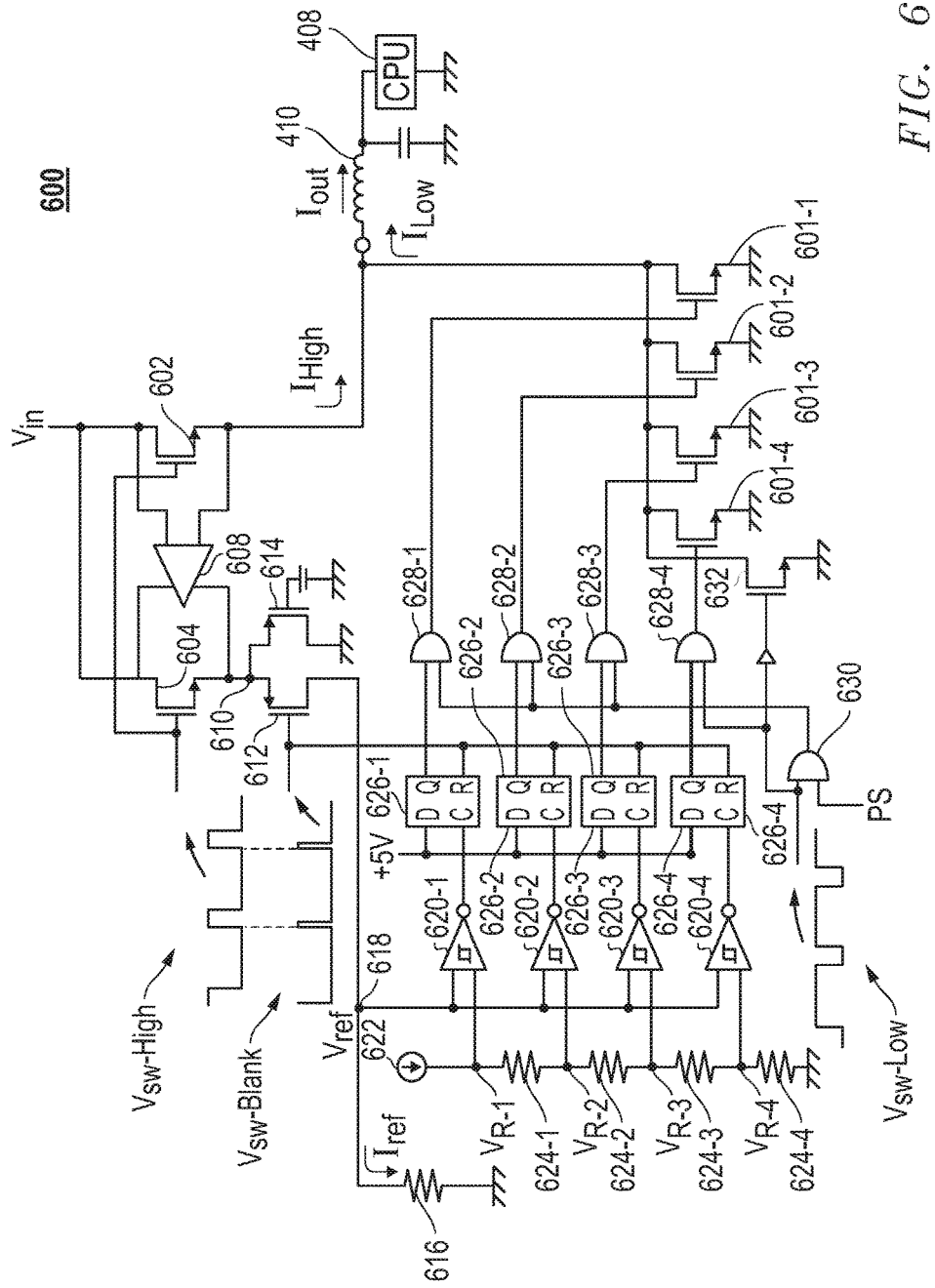
FIG. 6 is a circuit diagram illustrating relevant components of one embodiment of the DC-DC convertor shown in FIG. 5.

FIG. 6 illustrates relevant components of one embodiment of the DC-DC conversion circuit shown in FIG. 5. In this embodiment, drive circuits 520 take form in MOSFETs 601 coupled between ground and inductor 410 as shown. For purposes of explanation four MOSFETs 601-1-601-4 are shown (i.e., N=4), it being understood that a greater or smaller number of MOSFETs 601 can be employed in alternative embodiments. With N=4, each of VRL and DS is a 4-bit signal.

With continuing reference to FIG. 6, high-side driver circuit 402 takes form in a MOSFET 602 with a gate coupled to receive square wave Vsw-High. With each pulse of Vsw-High, MOSFET 602 transmits Ihigh to inductor 410. As noted above high-side current detect circuit 506 generates a reference current Iref that is proportional to Ihigh. In FIG. 6, high-side current detect circuit 506 includes a MOSFET 604 having a gate coupled to receive square wave Vsw-High. MOSFETs 602 and 604 may be fabricated using the same process and may have the same configuration, but with different sizes. In one embodiment, the gate of MOSFET 604 is several times smaller than the gate of MOSFET 602. Amplifier 608 amplifies the voltage across the source and drains of MOSFET 602 when it is activated. The amplified voltage is applied to the source and drains of MOSFET 604. With each pulse of Vsw-High, MOSFET 604 transmits Iref to node 610. U.S. patent application Ser. No. 12/620,438 entitled Current Sensing And Measuring Method And Apparatus, which is incorporated herein by reference, was filed Nov. 17, 2009 and describes additional aspects of generating Iref. Because MOSFET 604 is several times smaller than MOSFET 602, Iref will be substantially smaller than Ihigh.

Transient current may be introduced into Iref as a result of pulse noise at the rising edge of Vsw-High. The transient current may skew the proportionality of Iref to Ihigh. Fortunately, the transient current is short lived. Nonetheless, the transient current could adversely affect operation of DC-DC converter 400. To avoid this, Iref and any transient current is diverted to ground via MOSFET 614 during each pulse of Vsw-Blank, the leading edge of which coincides with the leading edge of each pulse of Vsw-High, and the time width of which is substantially less than the time width of the pulses of Vsw-High. All transient current components should subside during the Vsw-Blank pulse, at which point Iref is a proportional representation of Ihigh and is diverted to resistor 616 via activated MOSFET 612.

Iref flow through resistor 616 generates voltage Vref at node 618 with each pulse of Vsw-High. The magnitude of Vref, like Iref, should be proportional to Ihigh. Vref is provided as an input to inverting voltage comparators 620-1 through 620-4, the outputs of which define the 4-bit VRL signal. Each inverting comparator 620 generates either a high voltage or a low voltage at its output depending on its inputs Vref and a reference voltage VR. There are four reference voltages VR, which are generated using a constant current Ic provided by source 622. Since comparators 620 essentially have infinite resistance, substantially all of Ic flows through resistors 624-1-624-4, thereby creating reference voltages VR-1 through VR-4, respectively.

If Vref is greater than VR, the corresponding inverting comparator 620 will generate a low voltage at its output, and vice-versa. At the beginning of each cycle of Vsw-High, Vref is essentially ground and less than all of the reference voltages VR-1-VR-4. Accordingly, the outputs of inverting comparators 620 are in the high voltage state. Vref increases as Iref is transmitted to resistor 616. Inverting comparators 620-1 through 620-4 compare Vref with reference voltages VR-1 through VR-4, respectively, If a comparator 620 detects that Vref exceeds its corresponding reference voltage (e.g., VR-1) the inverting comparator output will switch from a high voltage state to a low voltage state. Thus, depending on the value of Vref, none, some, or all of inverting comparators 620 may switch their outputs from the high voltage state to the low voltage state during each cycle of Vsw-High. Between pulses of Vsw-High, the outputs of inverting comparators 620 return to the high voltage state since Vref drops to ground.

In the embodiment shown, low-side driver select circuit 504 includes D flip-flops 626. The outputs of inverting comparators 620-1 through 620-4 are coupled to the clock inputs (i.e., input C) of D flip-flops 626-1 through 626-4, respectively. The Q outputs of the D flip-flops correspond to the 4-bit DS signal. The D input of each of these flip-flops is tied to a high voltage. The reset (i.e., R) inputs of D flip-flops 626 are coupled to receive Vsw-Blank, and as a result, with each pulse of Vsw-Blank, D flip-flops 626 set their Q output to a low voltage state. However, if the voltage output of a corresponding inverting comparator 620 transitions from a high voltage to a low voltage, the Q output of the D flip-flop will transition from a low voltage to a high voltage, and this voltage will be held at the Q output at least until the next pulse of Vsw-Blank.

Q outputs of D flip-flops 626 are coupled to and control the gates of respective MOSFETS 601 via AND gates 628 as shown. AND gates 628-1 through 628-3 will pass the Q outputs they receive from flip-flops 626-1 through 626-3, respectively, to gates of MOSFETS 601-1 through 601-3, respectively, during a pulse of Vsw-Low if the power save (PS) signal input to AND gate 630 is asserted. AND gate 628-4 passes the Q output of flip-flop 626-4 to the gate of MOSFET 601-4 regardless of the state of PS during a pulse of Vsw-Low. It is noted that in addition to MOSFETS 601, the low side driver circuit 404 includes an additional MOSFET 632 that is activated with each pulse of Vsw-Low, regardless of the value of Vref or PS. When activated, MOSFET 632 transmits current from ground to output node 408 via inductor 410. In one embodiment, MOSFET 632 may be smaller than each of MOSFETS 520. The primary purpose of MOSFET 632 is to insure that a minimum amount of current flows to inductor 410 during each pulse of Vsw-Low.

MOSFETs 601 are controlled by the 4-bit DS signal generated by flip-flops 626, which are indirectly controlled by the magnitude of Ihigh. None, one, some, or all of MOSFETs 601 may be activated to transmit current from ground to inductor 410 during a cycle of Vsw-Low. The number of MOSFETs 601 activated will impact power consumption of the DS-DC convertor. Switching loss will increase with the number of MOSFETS activated during each cycle of Vsw-Low. On the other hand, current flow to inductor 410 during the pulse of Vsw-Low will be distributed across activated MOSFETs 601, thereby minimizing the conduction loss when compared the conduction loss that would result if the same current flowed through just one MOSFET 601.

The number of MOSFETs 601 activated per cycle of Vsw-Low depends on the magnitude of Ihigh current flow through high side driver MOSFET 602. To illustrate, if the CPU is drawing a large current, Ihigh will be relatively large in magnitude during the pulses of Vsw-High, and Vref, which is proportional to Ihigh, may exceed each of the reference voltages VR-1 through VR-4. In this situation, the output of all inverting comparators 626 will transition from high voltage to a low voltage during a pulse of Vsw-High, which in turn causes the Q outputs of flip-flops 626-1 through 626-4 to transition from low voltage to high voltage, thereby generating a DS signal that activates all MOSFETs 601, assuming PS is set to a high voltage. As a result, all MOSFETs 601 and MOSFET 632 will conduct current to inductor 410, the aggregate of which forms Ilow. It is noted that the conductive loss in DC-DC convertor 100 of FIG. 1 may be larger than the conductive loss in the DC-DC convertor shown in FIG. 6 assuming the aggregate of current flow through MOSFETs 601 equals I2 flow through Q2.

All four MOSFETs 601 may be activated for several cycles of Vsw-Low if the magnitude of Ihigh remains large. However, at some later point in time the current draw by the CPU may reduce substantially, which causes Vref to drop to a voltage that exceeds only VR-4. In this situation, the output of only flip-flop 626-4 will transition to high since only inverting comparator 620-4 will switch its output voltage from high to low. As a result a DS signal is generated that activates only MOSFET 601-4 during each Vsw-Low pulse, and only MOSFET 601-4 and MOSFET 632 will conduct current to inductor 410, the aggregate of which constitutes Ilow. It is noted that the switching loss of the DC-DC converter in this configuration should be less than the switching loss of the DC-DC convertor when all MOSFETs 601 are activated to transmit current during each Vsw-Low pulse. Also, it is noted the driver loss of the DC-DC converter in this configuration should be less than the driver loss of the DC-DC converter when all driver 628-1-4 and MOSFET 601-1-4 are activated.

Figure 7:
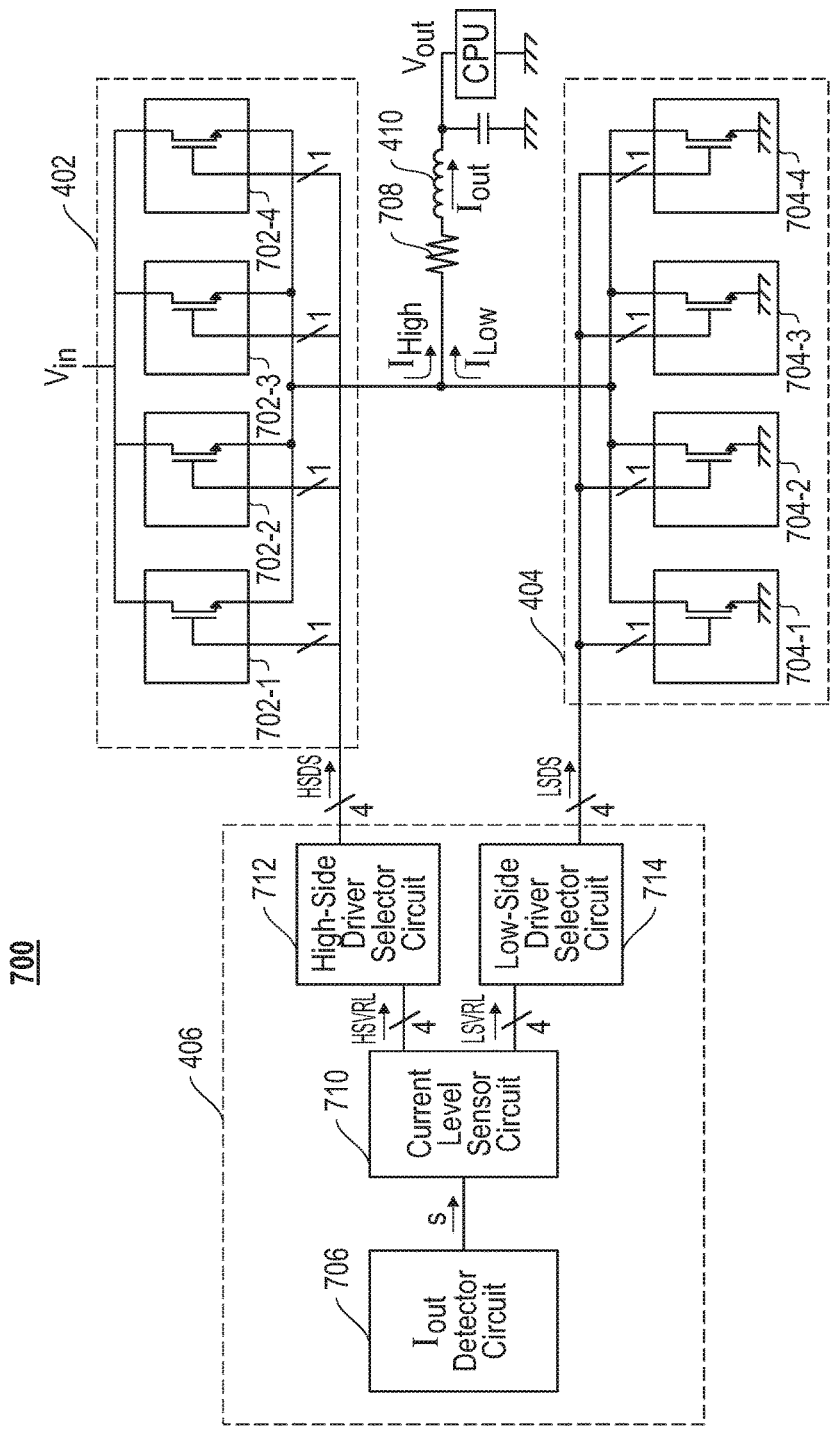
FIG. 7 is a block diagram illustrating relevant components of another embodiment of the DC-DC convertor shown in FIG. 4.

The DC-DC convertor of FIG. 6 contains a driver control circuit 406 that alters the configuration of low-side driver circuit 404, but not high-side driver circuit 402. FIG. 7 illustrates an alternative embodiment of the DC-DC converter shown in FIG. 4. In contrast to the DC-DC convertor of FIGS. 5 and 6, the DC-DC convertor 700 of FIG. 7 contains a driver control circuit 406 that alters the configuration of both low-side driver circuit 404 and high-side driver circuit 402 to minimize power consumption during operation.

In FIG. 7, high-side driver circuit 402 includes high-side drives 702 coupled in parallel to inductor 410 as shown. Similarly, low-side driver circuit 404 includes low-side drives 704 coupled in parallel to inductor 410 as shown. For purposes of explanation, this alternative DC-DC convertor 700 will be described with reference to high side driver circuit 402 having 4 high-side drives 702, and low-side driver circuit 404 having 4 low-side drives 704, it being understood the invention should not be limited thereto. In the embodiment shown, high-side drives 702 take form in MOSFETs of varying size coupled in parallel as shown, and low-side side drives 704 take form in MOSFETs of varying size coupled in parallel as shown. Moreover, the DC-DC convertor 700 is shown with an equal number of high-side drives 702 and low side drives 704, it being understood that in an alternative embodiment, an unequal number of high-side and low-side drivers can be employed. Further, although not shown, the high-side drives 702 and low-side drives 704 are controlled indirectly by complimentary square waves so that one or more high-side drives 702 transmit current to the CPU while the low-side drives 704 are inactive, and vice-versa.

The driver control circuit 406 in FIG. 7 includes an Iout detector circuit 706 configured to generate a signal S that is proportional to the magnitude of Iout. In one embodiment, Iout detector circuit 706 can generate signal S as a function of the voltage formed across shunt resistor 708, even though FIG. 7 does not show a connection between shunt resistor 708 and Iout detector circuit 706. In another embodiment, Iout detector circuit 706 generates signal S as a function of a voltage generated by the DC resistance of inductor 410.

Current level sensor circuit 710 receives signal S from output detection circuit 706, and in one embodiment generates separate multibit signals that are used by high-side driver selector circuit 712 and low-side driver selector circuit 714 to control high-side drives 702 and low-side drives 704, respectively. In the embodiment shown, current level sensor circuit 710 concurrently generates a 4-bit high side (HS) VRL signal and a 4-bit low side (LS) VRL signal, each of which varies with signal S, which in turn varies indirectly with the magnitude of Iout. High-side driver selector circuit 712 generates a 4-bit HSDS signal as a function of the 4-bit HSVRL signal, and low-side driver selector circuit 714 generates a 4-bit LSDS signal as a function of the 4-bit LSVRL signal. HSDS controls MOSFETs 702 while LSDS controls MOSFETs 704. In one embodiment, one or more MOSFETS 702 can be activated by HSDS to transmit current to inductor 410, and one or more MOSFETS 704 can be activated by LSDS to transmit current to inductor 410. Although not shown, complementary high-side and low-side square waves can be provided to high-side driver selector circuit 712 and low-side driver selector circuit 714, respectively. High-side driver selector circuit 712 may generate HSDS so that one or more MOSFETS 702 are activated to transmit current only during a pulse of the high-side square wave, and low-side driver selector circuit 714 may generate LSDS so that one or more MOSFETS 704 are activated to transmit current only during a pulse of the low-side square wave.

In one embodiment any one or more of MOSFETs 702 may be activated by HSDS while MOSFETS 704 are deactivated by LSDS, and any one or more of MOSFETs 702 may be activated by LSDS while MOSFETS 702 are deactivated by HSDS. If Iout is very large in magnitude, high-side driver selector 712 may generate a HSDS signal that activates all of the high side drive circuits 702 during each pulse of the high-side square wave, and low side driver selector circuit 714 may generate a LSDS signal that activates most, but not all of the low side drive circuits 704 during each pulse of the low-side square wave. Thereafter, Iout may drop, and in response high-side driver selector 712 may generate a HSDS signal that activates high side drive circuits 702-1, 702-3, and 702-4 during each pulse of the high-side square wave, and low side driver selector circuit 714 may generate a LSDS signal that activates low side drive circuits 704-1-704-3 during each pulse of the low-side square wave.

Figure 8:
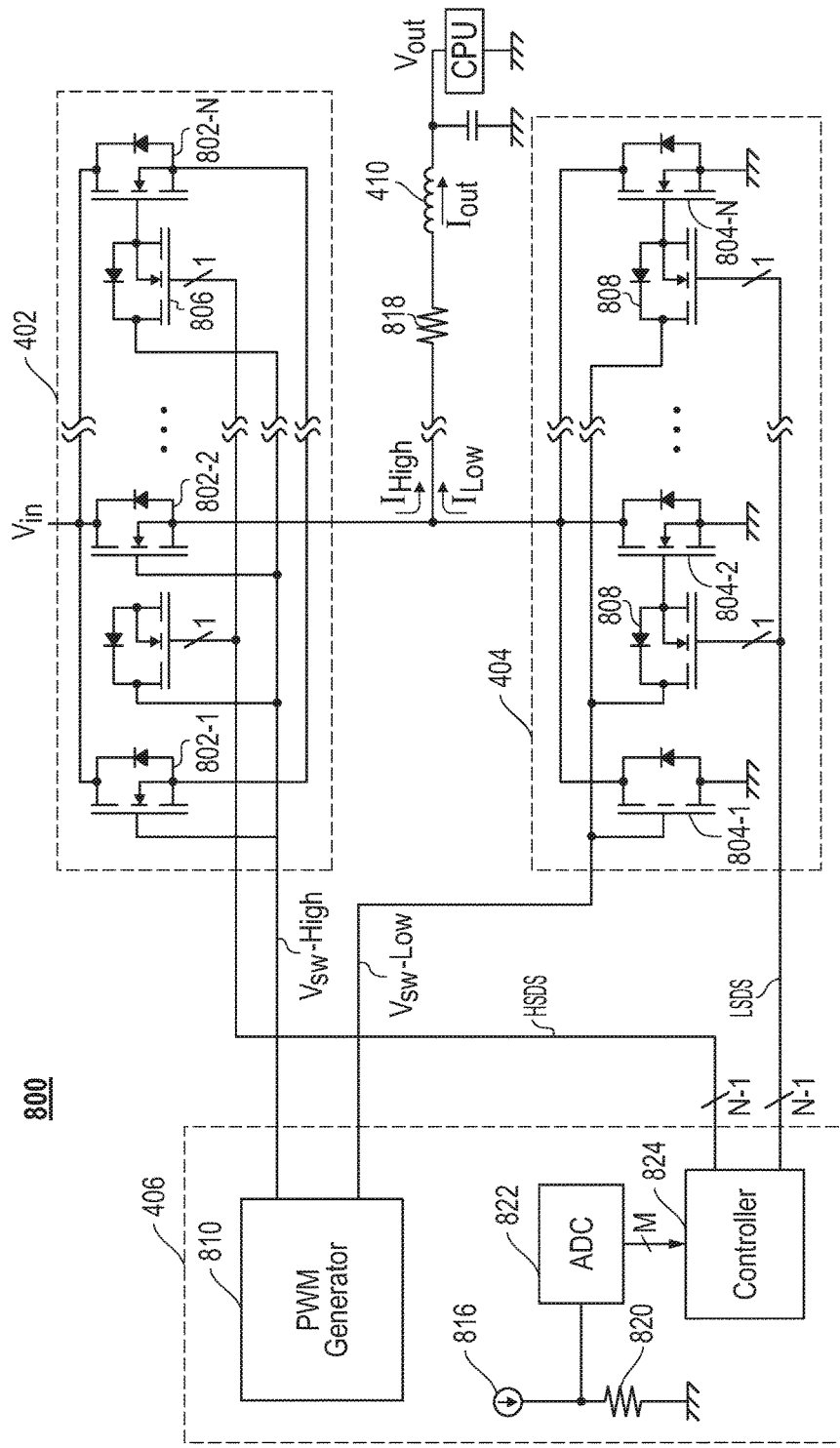
FIG. 8 is a circuit diagram illustrating relevant components of still another embodiment of the DC-DC convertor shown in FIG. 4.

FIG. 8 illustrates yet another embodiment of the DC-DC converter circuit shown within FIG. 4. Both the high-side driver circuit 402 and the low-side driver circuit 404 in this version, like DC-DC convertor 700, is capable of reconfiguration by driver control circuit 406 to accommodate changes in the magnitude of Iout. The high-side driver circuit 402 includes N drive MOSFETs 802 connected in parallel as shown. Drive MOSFETS 802 may differ in size from each other. Gate control MOSFETS 806 are coupled to the gates of select drive MOSFETS 802 as shown. As will be more fully described, gate control MOSFETs 806 control activation of MOSFETs 802 in accordance with a high-side DS (HSDS) signal generated by driver control circuit 406.

Low side driver circuit 404 also includes drive MOSFETs and gate control MOSFETs. In particular, the DC-DC convertor 800 includes N drive MOSFETs 804 connected in parallel as shown. Drive MOSFETS 804 may differ in size from each other. Gate control MOSFETS 808 coupled to the gates of select drive MOSFETS 804 as shown. Gate control MOSFETs 808 control activation of MOSFETs 804 in accordance with a low-side DS (LSDS) signal generated by driver control circuit 406. The HSDS and LSDS signals depend indirectly on the magnitude of Iout. In one embodiment, the HSDS and LSDS signals may be identical to each other when generated by driver control circuit 406, and in another embodiment they may differ.

Driver control circuit 406 includes a PWM generator 810 that generates complementary high-side and low-side square waves Vsw-high and Vsw-low, respectively, similar to the Vsw-high and Vsw-low square waves described in FIG. 6. Gate control MOSFETs 806 are coupled to receive and selectively pass Vsw-high to the gates of respective drive MOSFETs 802, while gate control MOSFETs 808 are coupled to receive and selectively pass Vsw-low to the gates of respective drive MOSFETs 808. Drive MOSFET 802-1 lacks a corresponding gate control MOSFET 806. In this configuration, the gate of MOSFET 802-1 is coupled to receive and is directly controlled by Vsw-high so that with each pulse MOSFET 802-1 transmits current to inductor 410. Drive MOSFET 804-1 in the low-side driver circuit 404 lacks a corresponding gate control MOSFET 808. Accordingly, the gate MOSFET 804-1 is coupled to receive and is directly controlled by Vsw-low so that with each pulse MOSFET 804-1 transmits current to inductor 410. Vsw-high and Vsw-low are complimentary such that one or more of MOSFETs 802 are active and transmitting current to inductor 410 with each pulse of Vsw-high while all MOSFETs 804 are inactive, and vice versa.

Driver control circuit 406 also includes a current generator 816 that can generate a reference current, which is proportional to an average of Iout. In one embodiment, current generator 816 or another circuit (not shown) can periodically measure the voltage across shunt resistor 818. This measured voltage is proportional to Iout. The measured voltages can be averaged, the result of which is used by current generator 816 to generate the reference current that flow through resistor 820. The reference voltage in turn is converted into a digital equivalent by analog to digital converter (ADC) 822.

A processor or microcontroller 824 concurrently generates HSDS and LSDS, which are multibit signals, as a function of the digital signal generated by ADC 822. HSDS and LSDS may change with the change in the digital output of ADC 822. Gate control MOSFETs 806 receive and are controlled by respective bits of HSDS, while gate control MOSFETs 808 receive and are controlled by respective bits of LSDS. When activated, gate control MOSFETs 806, pass the pulses of Vsw-high, and gate control MOSFETs 808, pass the pulses of Vsw-low.

The high-side driver circuit 402 and low-side driver circuit 404 are configurable to reduce power loss. To illustrate if Iout is large, then most if not all of the drive MOSFETs 802 and 804 are activated and transmitting current to inductor 410 during pulses of Vsw-high and Vsw-low, respectively. In this configuration, switching loss may be high for both the high-side driver circuit 402 and low-side driver circuit 404, but the conduction loss may be substantially less when compared to the conduction loss that would result if the same currents Ihigh and Ilow are transmitted by only MOSFETs 802-1 and 804-1, respectively. Subsequently, if Iout reduces substantially, controller 824 will generate a new HSDS that precludes activation of all MOSFETs 802 except 802-1 and 802-3 during the pulses of Vsw-high, and a new LSDS that precludes activation of all MOSFETs 804 except 804-1 and 802-4 during the pulses of Vsw-low. In this configuration, the switching loss should lower for both the high-side driver circuit 402 and low-side driver circuit 404.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:
1. A DC-DC convertor comprising:
an inductor coupled to an output node;
a first circuit for transmitting current to the output node via the inductor during a pulse of a pulse width modulation (PWM) signal, wherein the first circuit comprises a plurality of first transistors that vary in size, wherein the plurality of first transistors are coupled in parallel;
a second circuit for transmitting current to the output node via the inductor;
a current detector circuit for generating a signal corresponding to current flow through the first circuit;

a third circuit for generating a multibit signal based on the signal generated by the current detector circuit, wherein each bit of the multibit signal controls a respective one of the plurality first transistors.

2. The DC-DC convertor of claim 1 wherein each of the first transistors, when activated, is configured to transmit current to the output node via the inductor.

3. The DC-DC convertor of claim 1 wherein each of the first transistors comprises a source, a gate and a drain, wherein the gates of the second transistors vary in size.

4. The DC-DC convertor of claim 1 further comprising a pulse width modulation circuit coupled to the first circuit and configured to generate the PWM signal, wherein the first circuit is configured to transmit current to the inductor with each pulse the PWM signal.

5. The DC-DC convertor of claim 1 wherein the plurality of first transistors are coupled in parallel between an input to the inductor and a node configured to receive a first voltage, and wherein the second circuit is coupled between the input to the inductor and a node configured to be connected to a second voltage.

6. The DC-DC convertor of claim 1 wherein the signal generated by the current detector circuit is proportional to the current flow through the first circuit during the pulse of the PWM signal.

7. A method comprising:
a first circuit transmitting current to an output node via an inductor during a pulse of a pulse width modulation (PWM) signal, wherein the first circuit comprises a plurality of first transistors that vary in size, wherein the plurality of first transistors are coupled in parallel, wherein one or more of the first transistors transmit current to the output node during the pulse of the PWM signal;
a second circuit transmitting current to the output node via the inductor;
a current detector circuit generating a signal corresponding to current flow through the first circuit during the pulse of the PWM signal;
a third circuit generating a multibit signal based on the signal generated by the current detector circuit, wherein each bit of the multibit signal controls a respective one of the first transistors.

8. The method of claim 7 wherein the multibit signal enables activation of one or more first transistors, wherein each of the first transistors, when activated, transmit current to the output node via the inductor.

9. The method of claim 7 further comprising:
the third circuit generating a sample current that is proportional to the current flowing through the first circuit;
the third circuit generating a sample voltage that is proportional to the sample current;
the third circuit comparing the sample voltage to each of a plurality of reference voltages;
the third circuit generating the multibit signal based on the comparison of the sample voltage to each of the plurality of reference voltages.

10. The method of claim 7 wherein each of the first transistors comprises a gate, wherein the gates of the first transistors vary in size.

11. The method of claim 7 wherein the plurality of first transistors are coupled in parallel between an input to the inductor and a first voltage, and wherein the second circuit is coupled between the input to the inductor and a second voltage.

12. The method of claim 7 further comprising a pulse width modulation circuit generating the PWM signal, wherein the first circuit transmits current to the inductor with each pulse the PWM signal.

* * * * *